(12) United States Patent
Zhang et al.

(10) Patent No.: US 12,524,547 B2
(45) Date of Patent: Jan. 13, 2026

(54) METHODS AND APPARATUSES FOR STARTING APPLICATION ON TARGET PLATFORM

(71) Applicant: Alipay (Hangzhou) Information Technology Co., Ltd., Hangzhou (CN)

(72) Inventors: Yulong Zhang, Hangzhou (CN); Tao Wei, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 68 days.

(21) Appl. No.: 18/276,542

(22) PCT Filed: Jan. 25, 2022

(86) PCT No.: PCT/CN2022/073725
§ 371 (c)(1),
(2) Date: Aug. 9, 2023

(87) PCT Pub. No.: WO2022/170966
PCT Pub. Date: Aug. 18, 2022

(65) Prior Publication Data
US 2024/0095362 A1 Mar. 21, 2024

(30) Foreign Application Priority Data
Feb. 9, 2021 (CN) .......................... 202110176522.7

(51) Int. Cl.
*G06F 15/177* (2006.01)
*G06F 9/445* (2018.01)
(Continued)

(52) U.S. Cl.
CPC .......... *G06F 21/57* (2013.01); *G06F 9/44505* (2013.01); *G06F 9/4401* (2013.01)

(58) Field of Classification Search
CPC ...... G06F 21/57; G06F 9/44505; G06F 21/51; G06F 21/575
(Continued)

(56) References Cited

U.S. PATENT DOCUMENTS 8,176,336 B1 * 5/2012 Mao ................... G06F 9/45558
713/189
10,185,595 B1 * 1/2019 Ramatchandirane ........................
H04L 9/3236
(Continued)

FOREIGN PATENT DOCUMENTS

| CN | 102332070 A | 1/2012 |
| CN | 107533609 A | 1/2018 |

(Continued)

OTHER PUBLICATIONS

The International Search Report and Written Opinion of the International Searching Authority for International Application No. PCT/CN2022/073725 mailed on Apr. 6, 2022.
(Continued)

*Primary Examiner* — Volvick Derose
(74) *Attorney, Agent, or Firm* — Womble Bond Dickinson (US) LLP

(57) ABSTRACT

Embodiments of this specification provide a method and an apparatus for starting an application on a target platform, where the target platform includes at least a verifiable startup chip and a trusted execution environment, and the method includes: sequentially starting a plurality of system startup items based on a predetermined startup order, where starting a first startup item included in the plurality of system startup items includes: measuring a next startup item of the first startup item, and recording a measurement result into the verifiable startup chip; starting an attestation proxy program based on the trusted execution environment; and starting a first user application based on the trusted execution envi-
(Continued)

ronment, and determining, by the attestation proxy program, first attestation information corresponding to the first user application based on local attestation in the trusted execution environment.

15 Claims, 3 Drawing Sheets

(51) Int. Cl.
*G06F 21/57* (2013.01)
*G06F 9/4401* (2018.01)

(58) Field of Classification Search
USPC .................................................. 713/2
See application file for complete search history.

(56) References Cited

U.S. PATENT DOCUMENTS

| | | | |
|---|---|---|---|
| 10,742,421 B1* | 8/2020 | Wentz | H04L 9/0897 |
| 2008/0244569 A1* | 10/2008 | Challener | G06F 9/45558 |
| | | | 718/1 |
| 2009/0307487 A1* | 12/2009 | Movva | G06F 21/57 |
| | | | 713/156 |
| 2012/0096560 A1* | 4/2012 | Selander | G06F 21/10 |
| | | | 726/26 |
| 2013/0198838 A1 | 8/2013 | Schmidt et al. | |
| 2015/0188944 A1* | 7/2015 | Dyer | H04L 63/1416 |
| | | | 726/3 |
| 2015/0199520 A1* | 7/2015 | Woolley | G06F 21/57 |
| | | | 713/2 |
| 2015/0271435 A1* | 9/2015 | Gao | G06F 9/4401 |
| | | | 713/2 |
| 2016/0050071 A1* | 2/2016 | Collart | H04L 9/3234 |
| | | | 713/193 |
| 2016/0350534 A1* | 12/2016 | Poornachandran | G06F 21/554 |
| 2018/0034793 A1 | 2/2018 | Kibalo et al. | |
| 2018/0109538 A1* | 4/2018 | Kumar | H04L 63/08 |
| 2019/0243963 A1* | 8/2019 | Soriente | H04L 9/3247 |
| 2020/0349252 A1 | 11/2020 | Yu et al. | |
| 2021/0224757 A1* | 7/2021 | Carthy | G06Q 20/065 |
| 2022/0067165 A1* | 3/2022 | Huang | G06F 11/3024 |
| 2022/0277083 A1* | 9/2022 | Sasaki | G06F 21/577 |

FOREIGN PATENT DOCUMENTS

| | | |
|---|---|---|
| CN | 112329005 A | 2/2021 |
| CN | 112988262 A | 6/2021 |

OTHER PUBLICATIONS

"Extended European Search report" regarding Application No. 22752127.5, mailed on Oct. 9, 2024. pp. 1-12.

* cited by examiner

METHODS AND APPARATUSES FOR STARTING APPLICATION ON TARGET PLATFORM

TECHNICAL FIELD

One or more embodiments of this specification relate to the data security field, and in particular, to methods and apparatuses for starting an application on a target platform.

BACKGROUND

Currently, in scenarios such as multi-party computing, data outsourcing, and sensitive data processing, it is a technical requirement to protect code/data of a program from being stolen or destroyed by an attacker on a computing platform. In the existing technology, although some solutions are used to guarantee security of the code/data of the program, there are still disadvantages such as a protection vulnerability and dependence on a remote attestation service.

Therefore, protecting the code/data of the program on the computing platform is a problem to be alleviated urgently.

SUMMARY

Embodiments of this specification are intended to provide methods for more effectively protecting code/data of a program on a computing platform to address deficiencies in the existing technology.

According to a first aspect, a method for starting an application on a target platform is provided, where the target platform includes at least a verifiable startup chip and a trusted execution environment, and the method includes the following: a plurality of system startup items are sequentially started based on a predetermined startup order, where starting a first startup item included in the plurality of system startup items includes: measuring a next startup item of the first startup item, and recording a measurement result into the verifiable startup chip; an attestation proxy program is started based on the trusted execution environment; and a first user application is started based on the trusted execution environment, and the attestation proxy program determines first attestation information corresponding to the first user application based on local attestation in the trusted execution environment.

In an embodiment, the method further includes the following: the first attestation information is recorded into the verifiable startup chip.

In an embodiment, the method further includes the following: in response to an access request of a remote user of the target platform for the verifiable startup chip, a first record generated by the verifiable startup chip based on the first attestation information is provided for the remote user, so that the remote user determines security of the first user application and/or security of the target platform based on the first record.

In an embodiment, the first attestation information is maintained by the attestation proxy program, and the method further includes the following: in response to an access request of a remote user for the verifiable startup chip, a second record is provided for the remote user, where the second record is generated by the verifiable startup chip based on a first measurement result recorded when a tail startup item in the plurality of system startup items is started; and in response to a connection request of the remote user based on the first measurement result, the attestation proxy program establishes a trust channel with the remote user, and provides the first attestation information for the remote user by using the trust channel.

In an embodiment, the second record is used by the remote user to determine security of the target platform based on the second record.

In an embodiment, the first attestation information is used by the remote user to determine security of the first user application based on the first attestation information.

In an embodiment, the determining security of the target platform based on the second record includes the following: whether a version of an operating system (OS) and/or a virtual machine monitor (VMM) that are/is started by the target platform is a predetermined version is attested based on the second record, and security of the target platform is determined based on an attestation result.

In an embodiment, the verifiable startup chip includes one of a trusted platform module (TPM) chip, a trusted cryptography module (TCM) chip, a trusted platform control module (TPCM) chip, and a Titan chip.

In an embodiment, the method further includes the following: after the first user application is started, a second user application is started based on the trusted execution environment; and the attestation proxy program determines second attestation information corresponding to the second user application based on local attestation in the trusted execution environment.

In an embodiment, the first startup item in the plurality of system startup items is a core root of trust measurement (CRTM).

In an embodiment, the plurality of system startup items further include several of a bootloader, an operating system (OS), and a virtual machine monitor (VMM).

In an embodiment, the attestation proxy program includes at least a trusted part; the starting an attestation proxy program includes at least: executing the trusted part in the trusted execution environment; and starting the last item in the plurality of system startup items includes: measuring the trusted part, and recording a measurement result into the verifiable startup chip.

In an embodiment, the first user application includes at least a trusted part; the starting a first user application based on the trusted execution environment includes at least: executing the trusted part in the trusted execution environment; and the determining, by the attestation proxy program, first attestation information of the first user application based on local attestation in the trusted execution environment includes: the attestation proxy program determines the first attestation information corresponding to the first user application based on local attestation in the trusted execution environment and the trusted part.

In an embodiment, the determining, by the attestation proxy program, first attestation information corresponding to the first user application based on local attestation in the trusted execution environment includes: the attestation proxy program invokes a local attestation instruction of software guard extensions (SGX) to obtain the first attestation information corresponding to the first user application.

According to a second aspect, an apparatus for starting an application on a target platform is provided, where the target platform includes at least a verifiable startup chip and a trusted execution environment, and the apparatus includes: a system start unit, configured to sequentially start a plurality of system startup items based on a predetermined startup order, where starting a first startup item included in the plurality of system startup items includes: measuring a next startup item of the first startup item, and recording a measurement result into the verifiable startup chip; an attestation proxy start unit, configured to start an attestation proxy program based on the trusted execution environment; and a user application start unit, configured to start a first user application based on the trusted execution environment, and determine, by the attestation proxy program, first attestation information corresponding to the first user application based on local attestation in the trusted execution environment.

According to a third aspect, a computer-readable storage medium that stores a computer program is provided, where when the computer program is executed on a computer, the computer is enabled to perform the method according to the first aspect.

According to a fourth aspect, a computing device is provided, including a memory and a processor, where the memory stores executable code, and when executing the executable code, the processor implements the method according to the first aspect.

Based on one or more of the method, the apparatus, the computing device, and the storage medium in the above-mentioned aspects, a problem of protecting code/data of a program on a computing platform can be alleviated more effectively.

BRIEF DESCRIPTION OF DRAWINGS

To describe the technical solutions in the embodiments of this application more clearly, the following briefly describes the accompanying drawings needed for describing the embodiments. Clearly, the accompanying drawings in the following descriptions show merely some embodiments of this application, and a person of ordinary skill in the art can still derive other drawings from these accompanying drawings without creative efforts.

DESCRIPTION OF EMBODIMENTS

Figure 1:
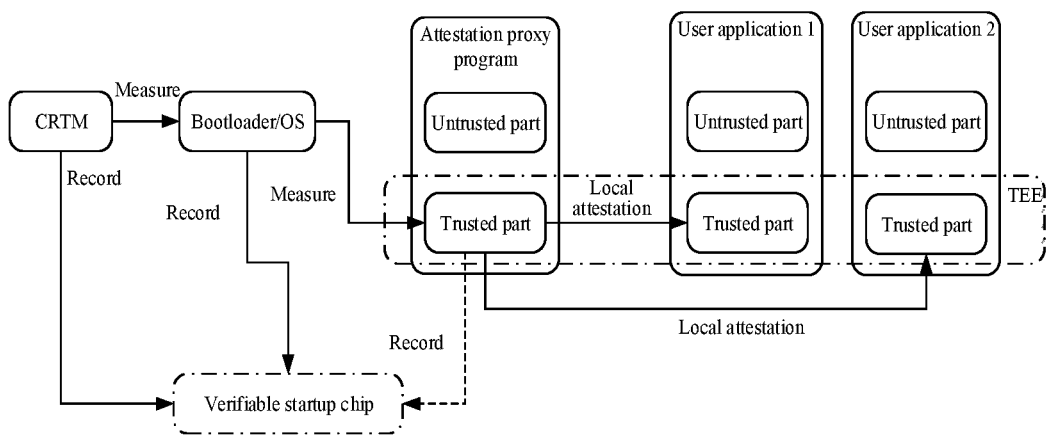
FIG. 1 is a schematic diagram illustrating a principle of a method for starting an application on a target platform, according to an embodiment of this specification.

The following describes the solutions provided in this specification with reference to the accompanying drawings.

As mentioned above, a current method for guaranteeing security of code/data of a program still has disadvantages such as a protection vulnerability and dependence on a remote attestation service. The inventor has studied the existing method for protecting code/data of a startup program, and has obtained the following conclusions.

Currently, a common method for protecting code/data of a program on a computing platform mainly includes a solution based on verifiable startup and a solution based on a trusted execution environment. Verifiable startup refers to a system startup process with level-by-level integrity attestation. A principle of the solution based on verifiable startup is as follows: Starting from a root of trust, the system is started step by step until a user program. When each startup item is started, a next startup item is measured and attested, and a result is written into a trusted record in a verifiable startup chip. For example, a trusted platform module (TPM) technology is used to write a hash value of a next startup item into a platform configuration register (PCR) in the TPM chip. A user can remotely invoke a startup trusted record (the record is signed to ensure integrity and authenticity) to determine whether an expected startup item and startup order are maintained in the system. However, a disadvantage of verifiable startup is that only security during startup can be ensured. If a dynamic attack is completed after startup, the solution is difficult to detect and defend against the attack.

The trusted execution environment is an encrypted or isolated execution environment that is considered to be secure and trusted. Therefore, code and data are not vulnerable to attacks outside the environment in an encrypted or isolated environment. A principle of the solution based on the trusted execution environment (TEE) is to exclude a high-privilege operating system (OS) or virtual machine monitor (VMM) from a trusted computing base (TCB), allowing the user to securely run, on an untrusted operating system or VMM, code and data that needs to be protected, and providing a capability of remote attestation. However, a primary disadvantage of the solution based on the trusted execution environment is to defend only against a direct attack from a malicious operating system or VMM, and a side-channel attack cannot be defended against. In addition, the solution based on the trusted execution environment depends more or less on remote attestation services provided by third-party vendors, resulting in dependence on external availability. Moreover, it is also necessary to assume that these third-party vendors do not exhibit a malicious behavior (for example, assume that no collusion attack or insider attack occurs).

To alleviate the problems existing in the above-mentioned technical solutions, in the embodiments of this specification, the inventor proposes a method and an apparatus for starting an application on a target platform. In this solution, trusted logic of a user application is isolated and executed in a trusted execution environment, to avoid a (non-side channel) direct attack of a malicious VMM/operating system. In addition, when attesting a program, a user can obtain attestation information of both a startup chain and a platform, to attest that the started VMM/operating system is in an expected state (for example, a trusted version having a small TCB and side-channel attack monitoring), so that a capability of defending against the side-channel attack is improved. Moreover, program attestation is based on a mechanism that combines verifiable startup and local attestation, and does not need to depend on an external attestation service such as IAS of the trusted execution environment. This greatly improves reliability and security of program attestation.

The following further describes a basic idea of the method.

FIG. 1 is a schematic diagram illustrating a principle of a method for starting an application on a target platform, according to an embodiment of this specification. As shown in FIG. 1, the target platform includes at least a verifiable startup chip, a trusted execution environment, and a plurality of startup items. The plurality of startup items includes a plurality of system startup items (a CRTM and a bootloader/OS shown in FIG. 1, where the first system startup item is the core root of trust measurement (CRTM)), an attestation proxy program, and several user applications (a user application 1 and a user application 2) based on a startup order. First, the plurality of system startup items are sequentially started, and during startup of any system startup item, a next startup item of the system startup item is measured, and a measurement result is recorded into the verifiable startup chip. Then, the attestation proxy program (or a trusted part of the attestation proxy program) is started in the TEE. Finally, the user application is started, and the attestation proxy program at least invokes local attestation in the trusted execution environment to obtain attestation information corresponding to the user application. The attestation proxy program can maintain the attestation information corresponding to the user application, or can record the attestation information into the verifiable startup chip.

Based on the method for starting an application on a target platform, the user application is executed in the trusted execution environment, so that an attack from a malicious VMM/operating system can be avoided. In addition, attestation of the application in the trusted execution environment is performed by the attestation proxy program by invoking local attestation, and no longer depends on an external attestation service of the trusted execution environment. Whether the started program and the started VMM/operating system are in an expected state can be further attested by using a trusted record generated by the verifiable startup chip based on measurement/attestation information recorded into the verifiable startup chip, to defend against a side-channel attack based on an attestation result.

The following further describes a specific process of the method.

Figure 2:
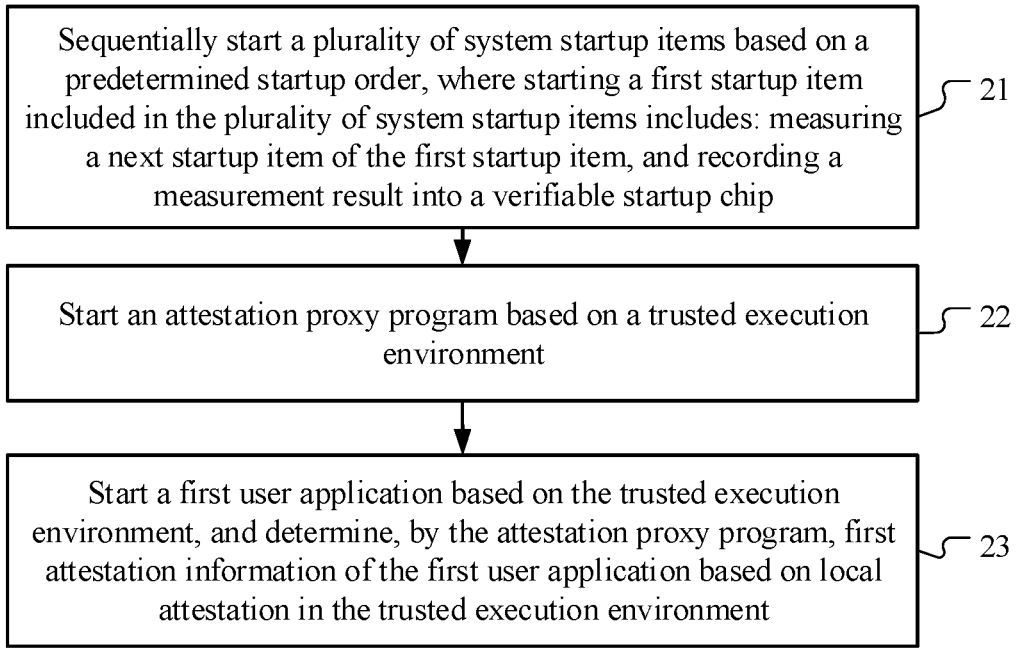
FIG. 2 is a flowchart illustrating a method for starting an application on a target platform, according to an embodiment of this specification.

FIG. 2 is a flowchart illustrating a method for starting an application on a target platform, according to an embodiment of this specification. The target platform includes at least a verifiable startup chip and a trusted execution environment, and the method includes at least the following steps.

Step 21: Sequentially start a plurality of system startup items based on a predetermined startup order, where starting a first startup item included in the plurality of system startup items includes: measuring a next startup item of the first startup item, and recording a measurement result into the verifiable startup chip.

As described above, verifiable startup refers to a system startup process with level-by-level integrity attestation. A principle of verifiable startup is to generate a trusted record, for a startup item, that can be used to perform step-by-step integrity attestation on the startup item, and the trusted record is generally implemented by using an independent verifiable startup chip. In different embodiments, different types of verifiable startup chips can be used. This specification sets no limitation on a specific type of the verifiable startup chip. In an embodiment, the verifiable startup chip can include one of a trusted platform module (TPM) chip, a trusted cryptography module (TCM) chip, a trusted platform control module (TPCM) chip, and a Titan chip.

Measurement of the startup item can include summarizing, representing, or identifying content of the startup item. Based on an implementation, hash calculation can be performed on a next startup item, to obtain a measurement result of the startup item. In another example, hash extension can be performed on a result obtained by performing hash calculation on a next startup item, to obtain a measurement result and record the measurement result. The so-called hash extension is a process of performing more than one nested hash operation based on the first obtained result of hash calculation and an added calculation item, to obtain a calculation result.

In an embodiment, in this step, a system startup order is shown in FIG. 1. A core root of trust measurement (CRTM) is a component that is started first on the target platform, and is also a root of trust of the entire system. After the CRTM is started, a next startup item (for example, a basic input/output system (BIOS)) is started, and then the BIOS starts a further startup item (for example, a bootloader, a VMM, and an operating system). The process is iterated until a user-mode program is started. The same as conventional verifiable startup, in this process, to establish a trust chain for a startup relationship, the next startup item (for example, the BIOS) is measured after the CRTM is started, and the BIOS measures the further startup item (for example, the bootloader) until the user-mode program is measured. Each measurement result is written into a corresponding trusted record (in the verifiable chip), and can be later displayed to a remote user.

In an embodiment, the first startup item in the plurality of system startup items is a core root of trust measurement (CRTM). In another embodiment, the plurality of system startup items can further include several of a bootloader, an operating system (OS), and a virtual machine monitor (VMM). In still another embodiment, a dynamic CRTM (D-CRTM) solution can also be used. In the dynamic CRTM (D-CRTM) solution, the BIOS is started before a D-CRTM, and a dynamic launch event (DL Event) is triggered during startup of the BIOS so as to start the D-CRTM. However, during startup of the BIOS, the step of measuring a next startup item and recording a result into the verifiable startup chip is not performed. In other words, whether a conventional CRTM (or referred to as a static CRTM (S-CRTM)) or the D-CRTM is used, the step of measuring a next startup item and recording a result into the verifiable startup chip is started during startup of the CRTM (the S-CRTM or the D-CRTM).

In an embodiment, during startup of the last system startup item, an attestation proxy program is measured, and a measurement result is recorded into the verifiable startup chip. Details of this embodiment are described later in this specification.

Step 22: Start the attestation proxy program based on the trusted execution environment.

The trusted execution environment (TEE) is a secure area of a main processor (CPU). As an isolated execution environment, the trusted execution environment can ensure that code and data loaded inside are protected with respect to confidentiality and integrity. For example, the TEE provides integrity of an application isolated and executed in the TEE and confidentiality of resources of the application. Alternatively, the TEE provides an execution space, and the execution space provides a higher level of security for trusted applications running on a device than an operating system (OS).

In different embodiments, the TEE can be implemented on different main processors, and there are different specific implementations for implementing the TEE on different main processors, for example, an SGX solution of implementing the TEE on a certain CPU and a TrustZone solution of implementing the TEE on another CPU. This specification sets no limitation on the specific implementation of the TEE.

In this step, different from conventional verifiable startup, an attestation proxy program is started before user programs (Apps). The same as the user programs (Apps) to be started in the future, the attestation proxy program runs by using the trusted execution environment technology. In an example, a trusted part (Trusted Logic) of the attestation proxy program can be loaded into the trusted execution environment to be executed through isolation and encryption.

A difference from the conventional verifiable startup manner further lies in that, in the conventional verifiable startup manner, the user programs (Apps) are directly measured in a process of starting the system startup item. However, in this embodiment of this specification, as described above, during startup of the last item in the plurality of system startup items, the attestation proxy program is measured, and the measurement result is recorded into the verifiable startup chip. In other words, an object that is finally measured in the system item is different from an object that records a result. In an embodiment, the attestation proxy program can include at least a trusted part. In this embodiment, a specific implementation of starting the last item in the plurality of system startup items in step 21 can be as follows: measuring the trusted part, and recording a measurement result into the verifiable startup chip.

Step 23: Start a first user application based on the trusted execution environment, and determine, by the attestation proxy program, first attestation information corresponding to the first user application based on local attestation in the trusted execution environment.

In this step, for the user application started after the attestation proxy program, the attestation proxy program at least invokes local attestation in the trusted execution environment to obtain the attestation information of the user application. For example, in an example, local attestation of the SGX can be invoked on the SGX platform to obtain the attestation information of the application. In another example, the attestation proxy program can obtain the attestation information of the application after performing extension calculation such as hash extension calculation by adding another data item on the basis of information obtained by attesting the user program by invoking local attestation in the trusted execution environment. Essentially, because the attestation proxy program and the user application run in a TEE on a same target platform, the attestation proxy program can implement authentication on the user application by invoking local attestation in the TEE, to avoid using remote attestation from a third party.

In an embodiment, the first user application can include at least a trusted part. The trusted part is executed in the trusted execution environment. The attestation proxy program determines the corresponding first attestation information based on local attestation in the trusted execution environment and the trusted part of the first user application. In a specific embodiment, the attestation proxy program can invoke a local attestation instruction of the software guard extensions (SGX) to obtain the first attestation information corresponding to the first user application.

In an embodiment, the method can further include the following: after the first user application is started, a second user application is started based on the trusted execution environment; and the attestation proxy program determines second attestation information corresponding to the second user application based on local attestation in the trusted execution environment. In other words, attestation information of each user application started after the attestation proxy program is started is determined by the attestation proxy program based on local attestation in the TEE. This is again different from verifiable startup where a next startup program is sequentially attested in a chain manner.

In different implementations, the attestation information corresponding to the user application may be written into the verifiable startup chip, or may not be written into the chip, but is maintained only by the attestation proxy program, so that different remote attestation manners can be provided for a user who performs remote attestation on the startup program.

Figure 3:
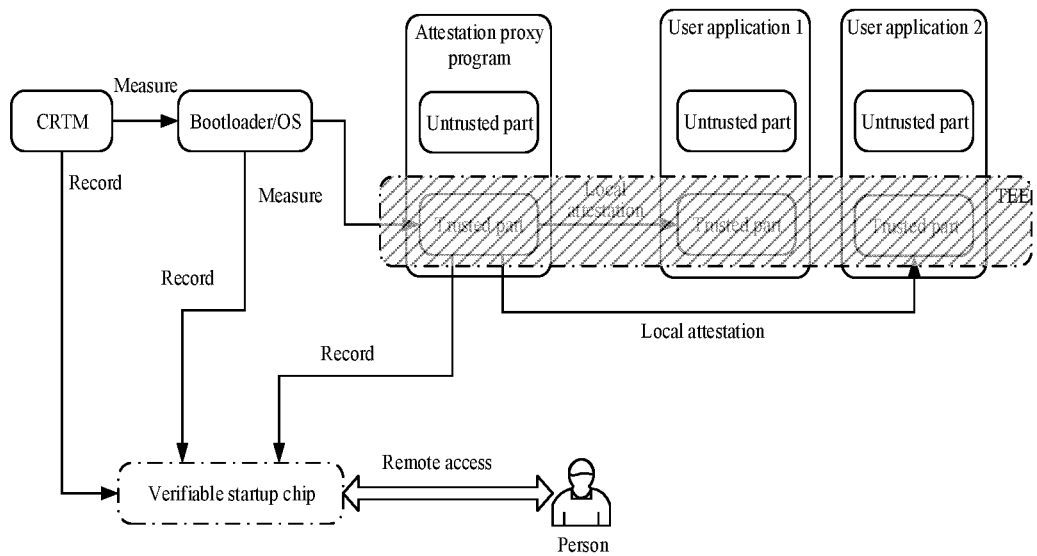
FIG. 3 is a flowchart illustrating an implementation of a method for starting an application on a target platform, according to an embodiment of this specification.

Therefore, based on an implementation, as shown in FIG. 3, the first attestation information can be recorded into the verifiable startup chip. In an embodiment, when a remote user of the target platform expects to perform remote attestation on security of the target platform, the user can send an access request to the verifiable startup chip in the target platform. In response to the access request, the target platform can provide, for the remote user, a first record generated by the verifiable startup chip based on the first attestation information. In this way, the remote user can determine security of the first user application and/or security of the target platform based on the first record.

In an example of this implementation, the remote user can establish, on a platform of the remote user, a same running environment as the target platform based on a program version number of a startup item on the target platform, obtain a corresponding value of the first record accordingly, and determine security of startup items (including a system startup item and a user application startup item) on a startup chain of the target platform based on the corresponding value of the first record and the first record. In an example, if the corresponding value of the first record matches the first record, it indicates that all startup items on the startup chain of the target platform are complete and correct, that is, both the target platform and the application started on the target platform are secure. If the corresponding value of the first record does not match the first record, it indicates that at least one of the startup items on the startup chain of the target platform is incomplete or incorrect, that is, one or more of the target platform and the application started on the target platform are not secure.

In another example of this implementation, the remote user can obtain a corresponding value of the first record from, for example, a trusted third party. Other execution processes are the same as corresponding parts in the execution process of the previous example, and details are omitted here for simplicity.

Figure 4:
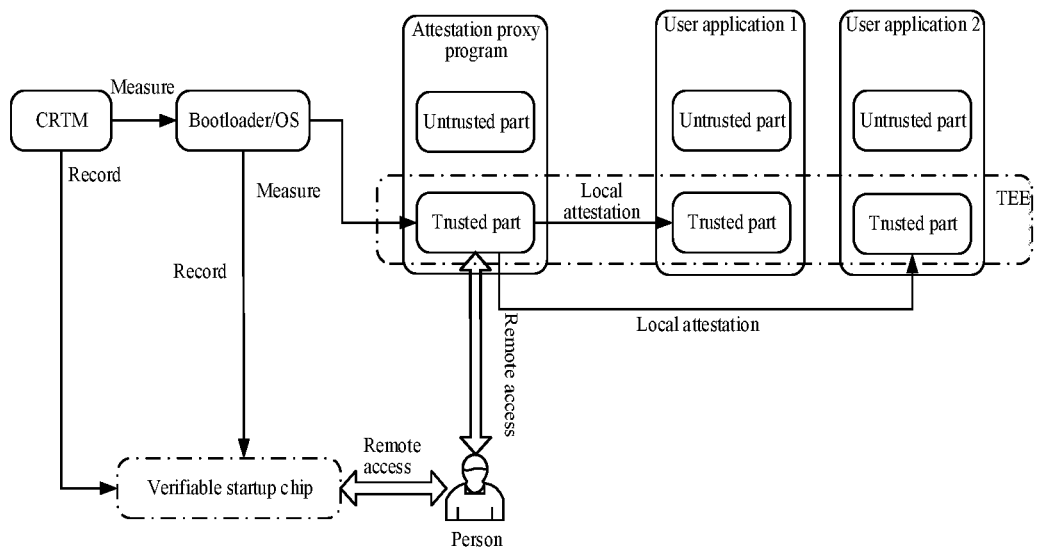
FIG. 4 is a flowchart illustrating another implementation of a method for starting an application on a target platform, according to an embodiment of this specification.

Based on another implementation, as shown in FIG. 4, the first attestation information can be maintained by the attestation proxy program. In an embodiment, when a remote user of the target platform expects to perform remote attestation on security of the target platform, the user can still send an access request to the verifiable startup chip in the target platform. In response to the access request, the target platform provides a second record for the remote user, where the second record is generated by the verifiable startup chip based on a first measurement result recorded when a tail startup item in the plurality of system startup items is started. It should be understood that the tail startup item is the last system startup item, and a program started after the tail startup item is the attestation proxy program. Therefore, the first measurement result recorded when the tail startup item is started is a measurement result corresponding to the attestation proxy program. In this case, the remote user can send a connection request to the attestation proxy program based on the first measurement result. In response to the connection request, the attestation proxy program can establish a trust channel with the remote user, and provide the first attestation information for the remote user by using the trust channel.

In an example, the first attestation information can be used by the remote user to determine security of the first user application based on the first attestation information. In another example, the second record can be used by the remote user to determine security of the target platform based on the second record. In a specific example, the second record can be used by the remote user to attest, based on the second record, whether a version of an operating system (OS) and/or a virtual machine monitor (VMM) that are/is started on the target platform is a predetermined version, and determine security of the target platform based on an attestation result.

Specifically, the remote user can establish, on a platform of the remote user, a same running environment as the target platform based on a program version number of each startup item on the target platform, so as to obtain corresponding values of the second record and the first attestation information on the platform of the remote user, and determine security of the system startup item and the attestation proxy program on a startup chain of the target platform based on the corresponding value of the second record and the second record. In an example, if the corresponding value of the second record matches the second record, it can be determined that the system startup items and the attestation proxy program on the startup chain of the target platform are complete and correct, that is, it can be determined that the system running on the target platform is secure. Then, in another example, integrity and correctness of the first user application can be determined based on the corresponding value of the first attestation information and the first attestation information. If the corresponding value of the first attestation information matches the first attestation information, it can be determined that the first user application is secure.

In another example, the remote user can obtain corresponding values of the second record and the first attestation information from, for example, a trusted third party. Other execution processes are the same as corresponding parts in the execution process of the previous example, and details are omitted here for simplicity.

Figure 5:
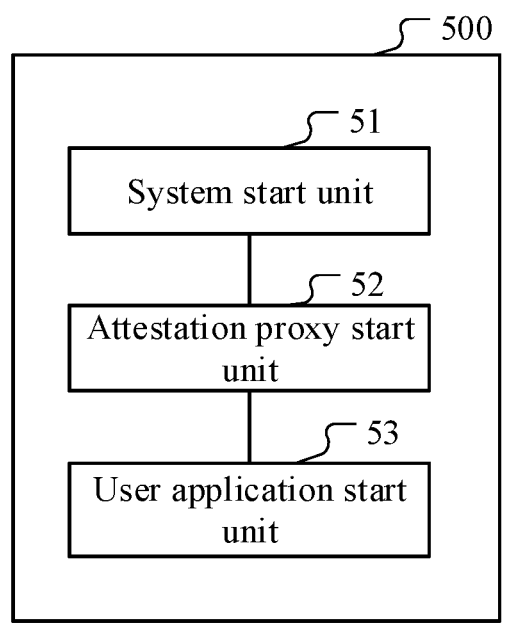
FIG. 5 is a structural diagram illustrating an apparatus for starting an application on a target platform, according to an embodiment of this specification.

FIG. 5 is a structural diagram illustrating an apparatus for starting an application on a target platform, according to an embodiment of this specification. The target platform includes at least a verifiable startup chip and a trusted execution environment. As shown in FIG. 5, the apparatus 500 includes: a system start unit 51, configured to sequentially start a plurality of system startup items based on a predetermined startup order, where starting a first startup item included in the plurality of system startup items includes: measuring a next startup item of the first startup item, and recording a measurement result into the verifiable startup chip; an attestation proxy start unit 52, configured to start an attestation proxy program based on the trusted execution environment; and a user application start unit 53, configured to start a first user application based on the trusted execution environment, and determine, by the attestation proxy program, first attestation information corresponding to the first user application based on local attestation in the trusted execution environment.

In an embodiment, the apparatus 500 can further include a record unit, configured to record the first attestation information into the verifiable startup chip.

In an example, the apparatus 500 can further include a first response unit, configured to: in response to an access request of a remote user of the target platform for the verifiable startup chip, provide, for the remote user, a first record generated by the verifiable startup chip based on the first attestation information, so that the remote user determines security of the first user application and/or security of the target platform based on the first record.

In an embodiment, the user application start unit 53 can be further configured to maintain the first attestation information by the attestation proxy program. The apparatus 500 can further include: a second response unit, configured to: in response to an access request of a remote user for the verifiable startup chip, provide a second record for the remote user, where the second record is generated by the verifiable startup chip based on a first measurement result recorded when a tail startup item in the plurality of system startup items is started; and a third response unit, configured to: in response to a connection request of the remote user based on the first measurement result, establish, by the attestation proxy program, a trust channel with the remote user, and provide the first attestation information for the remote user by using the trust channel.

In an example, the second record is used by the remote user to determine security of the target platform based on the second record.

In an example, the first attestation information can be used by the remote user to determine security of the first user application based on the first attestation information.

The second response unit can be further configured to: the determining security of the target platform based on the second record includes: attest, based on the second record, whether a version of an operating system (OS) and/or a virtual machine monitor (VMM) that are/is started on the target platform is a predetermined version, and determine security of the target platform based on an attestation result.

In an embodiment, the verifiable startup chip can include one of a trusted platform module (TPM) chip, a trusted cryptography module (TCM) chip, a trusted platform control module (TPCM) chip, and a Titan chip.

In an embodiment, the user application start unit can be further configured to: after the first user application is started, start second user application based on the trusted execution environment. The user application start unit can be further configured to determine, by the attestation proxy program, second attestation information corresponding to the second user application based on local attestation in the trusted execution environment.

In an embodiment, the first startup item in the plurality of system startup items can be a core root of trust measurement (CRTM). In an example, the plurality of system startup items can further include several of a bootloader, an operating system (OS), and a virtual machine monitor (VMM).

In an embodiment, the attestation proxy program can include at least a trusted part. The attestation proxy start unit can be further configured to execute the trusted part in the trusted execution environment. The system start unit can be further configured to measure the trusted part, and record a measurement result into the verifiable startup chip.

In an embodiment, the first user application includes at least a trusted part. The user application start unit can be further configured to execute the trusted part in the trusted execution environment. The attestation proxy program determines the first attestation information corresponding to the first user application based on local attestation in the trusted execution environment and the trusted part of the first user application.

In an embodiment, the user application start unit can be further configured to invoke, by the attestation proxy program, a local attestation instruction of software guard extensions (SGX) to obtain the first attestation information corresponding to the first user application.

Another aspect of this specification provides a computer-readable storage medium that stores a computer program, where when the computer program is executed on a computer, the computer is enabled to perform any one of the methods.

Another aspect of this specification provides a computing device, including a memory and a processor, where the memory stores executable code, and when executing the executable code, the processor implements any one of the methods.

It should be understood that descriptions such as "first" and "second" in this specification are merely intended to distinguish between similar concepts for ease of description, and do not impose a limitation.

A person skilled in the art should be aware that in the above-mentioned one or more examples, functions described in this application can be implemented by hardware, software, firmware, or any combination thereof. When this application is implemented by software, the functions can be stored in a computer-readable medium or transmitted as one or more instructions or code in the computer-readable medium.

The objectives, technical solutions, and beneficial effects of this application are further described in detail in the above-mentioned specific implementations. It should be understood that the above-mentioned descriptions are merely specific implementations of this application, but are not intended to limit the protection scope of this application. Any modification, equivalent replacement, or improvement made based on the technical solutions of this application shall fall within the protection scope of this application.

What is claimed is:

1. A method for starting an application on a target platform, wherein the target platform comprises at least a verifiable startup chip and a trusted execution environment, and the method comprises:
   sequentially starting a plurality of system startup items based on a predetermined startup order, wherein starting a first startup item comprised in the plurality of system startup items comprises: measuring a next startup item of the first startup item, and recording a measurement result into the verifiable startup chip;
   starting an attestation proxy program based on the trusted execution environment;
   starting a first user application based on the trusted execution environment, and determining, by the attestation proxy program, first attestation information corresponding to the first user application based on local attestation in the trusted execution environment, wherein the first attestation information is maintained by the attestation proxy program;
   in response to an access request of a remote user for the verifiable startup chip, providing a second record for the remote user, wherein the second record is generated by the verifiable startup chip based on a first measurement result recorded when a tail startup item in the plurality of system startup items is started; and
   in response to a connection request of the remote user based on the first measurement result, establishing, by the attestation proxy program, a trust channel with the remote user, and providing the first attestation information for the remote user by using the trust channel.

2. The method according to claim 1, further comprising: recording the first attestation information into the verifiable startup chip.

3. The method according to claim 2, further comprising:
   in response to an access request of a remote user of the target platform for the verifiable startup chip, providing, for the remote user, a first record generated by the verifiable startup chip based on the first attestation information, so that the remote user determines security of the first user application and/or security of the target platform based on the first record.

4. The method according to claim 1, wherein the second record is used by the remote user to determine security of the target platform based on the second record.

5. The method according to claim 4, wherein the determining security of the target platform based on the second record comprises: attesting, based on the second record, whether a version of an operating system (OS) and/or a virtual machine monitor (VMM) that are/is started on the target platform is a predetermined version, and determining security of the target platform based on an attestation result.

6. The method according to claim 1, wherein the first attestation information is used by the remote user to determine security of the first user application based on the first attestation information.

7. The method according to claim 1, wherein the verifiable startup chip comprises one of a trusted platform module (TPM) chip, a trusted cryptography module (TCM) chip, a trusted platform control module (TPCM) chip, and a Titan chip.

8. The method according to claim 1, wherein after the first user application is started, the method further comprises:
   starting a second user application based on the trusted execution environment; and
   determining, by the attestation proxy program, second attestation information corresponding to the second user application based on local attestation in the trusted execution environment.

9. The method according to claim 1, wherein the first startup item in the plurality of system startup items is a core root of trust measurement (CRTM).

10. The method according to claim 9, wherein the plurality of system startup items further comprise several of a bootloader, an operating system (OS), and a virtual machine monitor (VMM).

11. The method according to claim 1, wherein the attestation proxy program comprises at least a trusted part;
    the starting an attestation proxy program comprises at least: executing the trusted part in the trusted execution environment; and
    starting the last item in the plurality of system startup items comprises: measuring the trusted part, and recording a measurement result into the verifiable startup chip.

12. The method according to claim 1, wherein the first user application comprises at least a trusted part;
    the starting a first user application based on the trusted execution environment comprises at least: executing the trusted part in the trusted execution environment; and
    the determining, by the attestation proxy program, first attestation information of the first user application based on local attestation in the trusted execution environment comprises:
    determining, by the attestation proxy program, the first attestation information corresponding to the first user application based on local attestation in the trusted execution environment and the trusted part.

13. The method according to claim 1, wherein the determining, by the attestation proxy program, first attestation information corresponding to the first user application based on local attestation in the trusted execution environment comprises: invoking, by the attestation proxy program, a local attestation instruction of software guard extensions (SGX) to obtain the first attestation information corresponding to the first user application.

14. A non-transitory computer-readable storage medium having stored therein instructions that, when executed by a processor of a device, cause the device to:
- sequentially start a plurality of system startup items based on a predetermined startup order, wherein starting a first startup item comprised in the plurality of system startup items comprises: measuring a next startup item of the first startup item, and recording a measurement result into the verifiable startup chip;
- start an attestation proxy program based on the trusted execution environment;
- start a first user application based on the trusted execution environment, and determine, by the attestation proxy program, first attestation information corresponding to the first user application based on local attestation in the trusted execution environment, wherein the first attestation information is maintained by the attestation proxy program;
- in response to an access request of a remote user for the verifiable startup chip, provide a second record for the remote user, wherein the second record is generated by the verifiable startup chip based on a first measurement result recorded when a tail startup item in the plurality of system startup items is started; and
- in response to a connection request of the remote user based on the first measurement result, establish, by the attestation proxy program, a trust channel with the remote user, and provide the first attestation information for the remote user by using the trust channel.

15. A computing device, comprising a memory and a processor, wherein the memory stores executable instructions that, in response to execution by the processor, cause the computing device to:
- sequentially start a plurality of system startup items based on a predetermined startup order, wherein starting a first startup item comprised in the plurality of system startup items comprises: measuring a next startup item of the first startup item, and recording a measurement result into the verifiable startup chip;
- start an attestation proxy program based on the trusted execution environment;
- start a first user application based on the trusted execution environment, and determine, by the attestation proxy program, first attestation information corresponding to the first user application based on local attestation in the trusted execution environment, wherein the first attestation information is maintained by the attestation proxy program;
- in response to an access request of a remote user for the verifiable startup chip, provide a second record for the remote user, wherein the second record is generated by the verifiable startup chip based on a first measurement result recorded when a tail startup item in the plurality of system startup items is started; and
- in response to a connection request of the remote user based on the first measurement result, establish, by the attestation proxy program, a trust channel with the remote user, and provide the first attestation information for the remote user by using the trust channel.

* * * * *